United States Patent

[11] 3,601,591

[72] Inventors Brian Ronald Gaines
Cambridge;
Peter Lawrence Joyce, Bishops Stortford,
both of, England
[21] Appl. No. 752,060
[22] Filed Aug. 12, 1968
[45] Patented Aug. 24, 1971
[73] Assignee International Standard Electric Corporation
New York, N.Y.
[32] Priority Aug. 17, 1967
[33] Great Britain
[31] 37851/67

[54] DIGITAL DIFFERENTIAL ANALYZER EMPLOYING COUNTERS CONTROLED BY LOGIC LEVELS
6 Claims, 11 Drawing Figs.

[52] U.S. Cl. .......... 235/152, 235/150.31, 235/156, 235/176
[51] Int. Cl. .......... G06f 7/50, G06f 7/52
[50] Field of Search .......... 235/152, 150.31, 156, 176

[56] References Cited
UNITED STATES PATENTS
3,050,251 8/1962 Steele .......... 235/152 X
3,274,376 9/1966 Evans et al. .......... 235/150.31

*Primary Examiner*—Malcolm A. Morrison
*Assistant Examiner*—David H. Malzahn
*Attorneys*—C. Cornell Remsen, Jr., Walter J. Baum, Percy P. Lantzy, Philip M. Bolton, Isidore Togut and Charles L. Johnson, Jr.

ABSTRACT: Data processing equipment wherein the registers are interconnected to perform the functions of analog computing loops, a sequencer unit consisting of a plurality of programmable registers responds to outputs derived from the processor, and the outputs of the sequencer registers being arranged to control the interconnection patterns in the processor.

Inventors
BRIAN R. GAINES
PETER L. JOYCE
By [signature]
Attorney

Inventors
BRIAN R. GAINES
PETER L. JOYCE
By [signature]
Attorney

Inventors
BRIAN R. GAINES
PETER L. JOYCE
By [signature]
Attorney

Inventors
BRIAN R. GAINES
PETER L. JOYCE
By [signature]
Attorney

Inventors
BRIAN R. GAINES
PETER L. JOYCE
By [signature]
Attorney

| | | | | | |
|---|---|---|---|---|---|
| Seq. W | State | 1 | 2 | 3 | 4 |
| | Reset | | | $A_0$ | $A_0$ |
| | Advance | PB | $C_0$ | $B_0$ | |
| Counter Input | A | 0 | 0 | 1 | 1 |
| | B | 0 | 0 | 1 | 1 |
| | C | 0 | 1 | 0 | 1 |

0 ≡ Off
1 ≡ On

Inventors
BRIAN R. GAINES
PETER L. JOYCE
By [signature]
Attorney

Inventors
BRIAN R. GAINES
PETER L. JOYCE
By [signature]
Attorney

DIGITAL DIFFERENTIAL ANALYZER EMPLOYING COUNTERS CONTROLED BY LOGIC LEVELS

This invention relates to data processing equipments in which an incremental digital system enables pseudoanalog computing loops to be established so that complex computing operations may be performed with a speed and simplicity comparable to that of simple operations such as add, subtract and transfer. Typical complex computing operations which can be performed by the invention are division, square root calculation, rectangular, polar, hyperbolic coordinate transformations, and so on.

According to the invention there is provided a data processing equipment including a processor or computing unit, a processor sequencer unit, input and output devices for the processor, input and output devices for the sequencer and auxiliary memory means available to both the processor and the sequencer, the processor consisting of a plurality of active storage registers providing incremental digital computing elements, the registers being interconnected by interregister modulating means, feedback connections and input control logic, whereby the registers may be interconnected to perform the functions of analog computing loops, the sequencer consisting of a plurality of programmable registers responsive to outputs derived from the processor, the outputs of the sequencer registers being arranged to control the interconnection patterns in the processor.

The programming facility enables the complex computing operations to be performed as a sequence of elementary operations.

Figure 1:
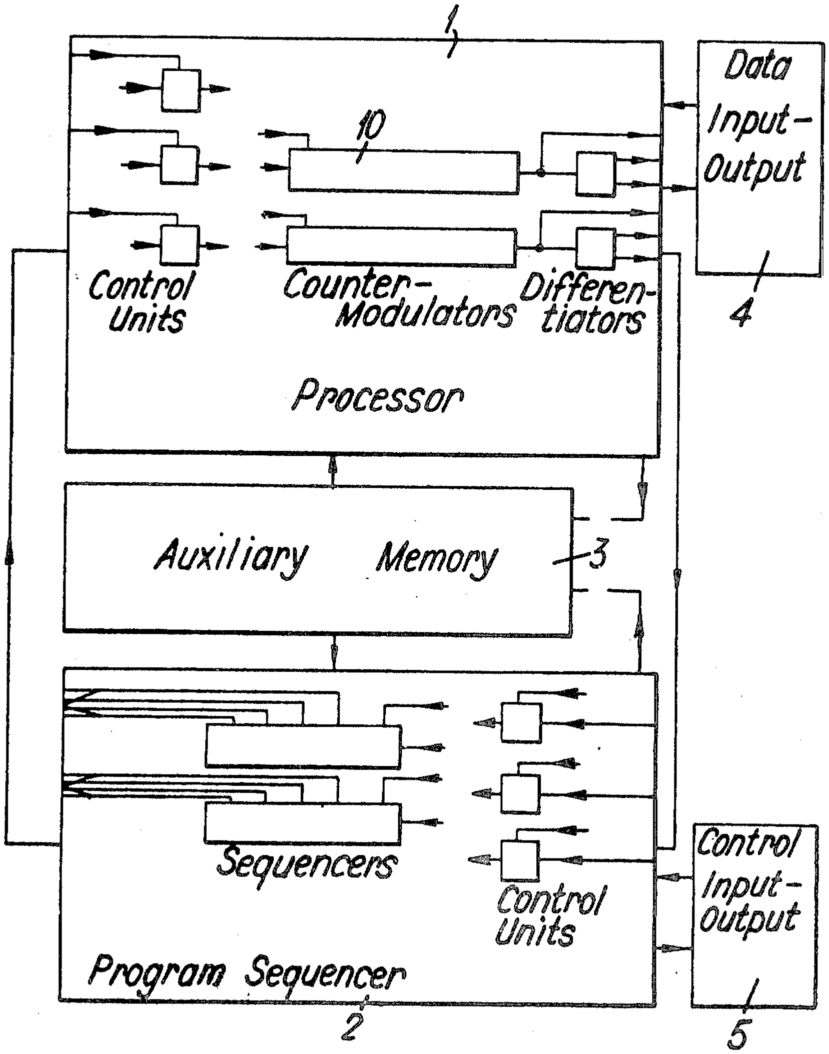
Figure 2:
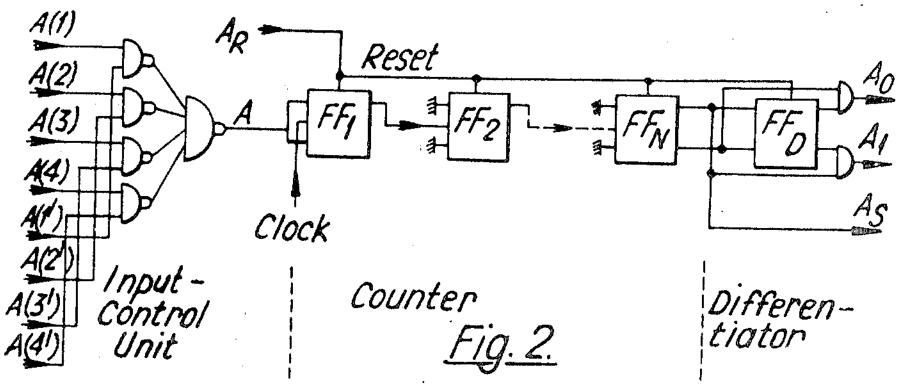
Figure 3:
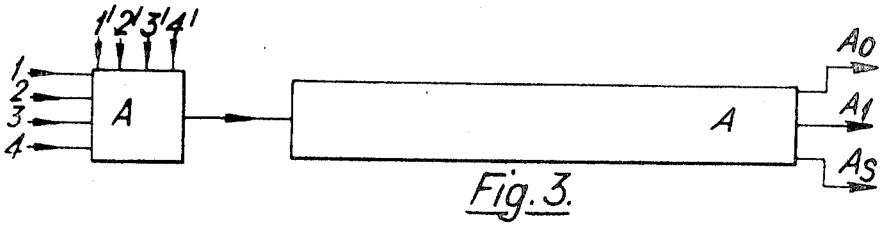
Figure 5:
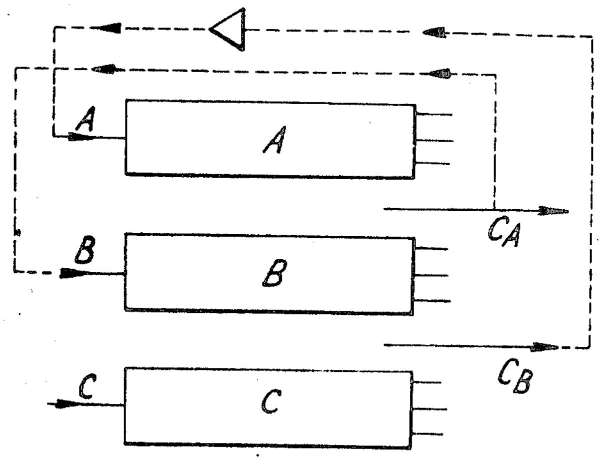
Figure 4:
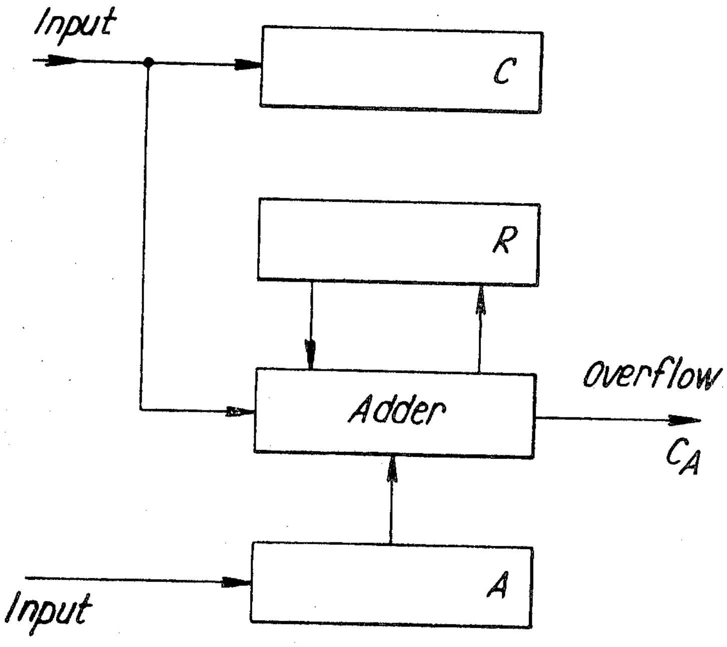
Figure 6:
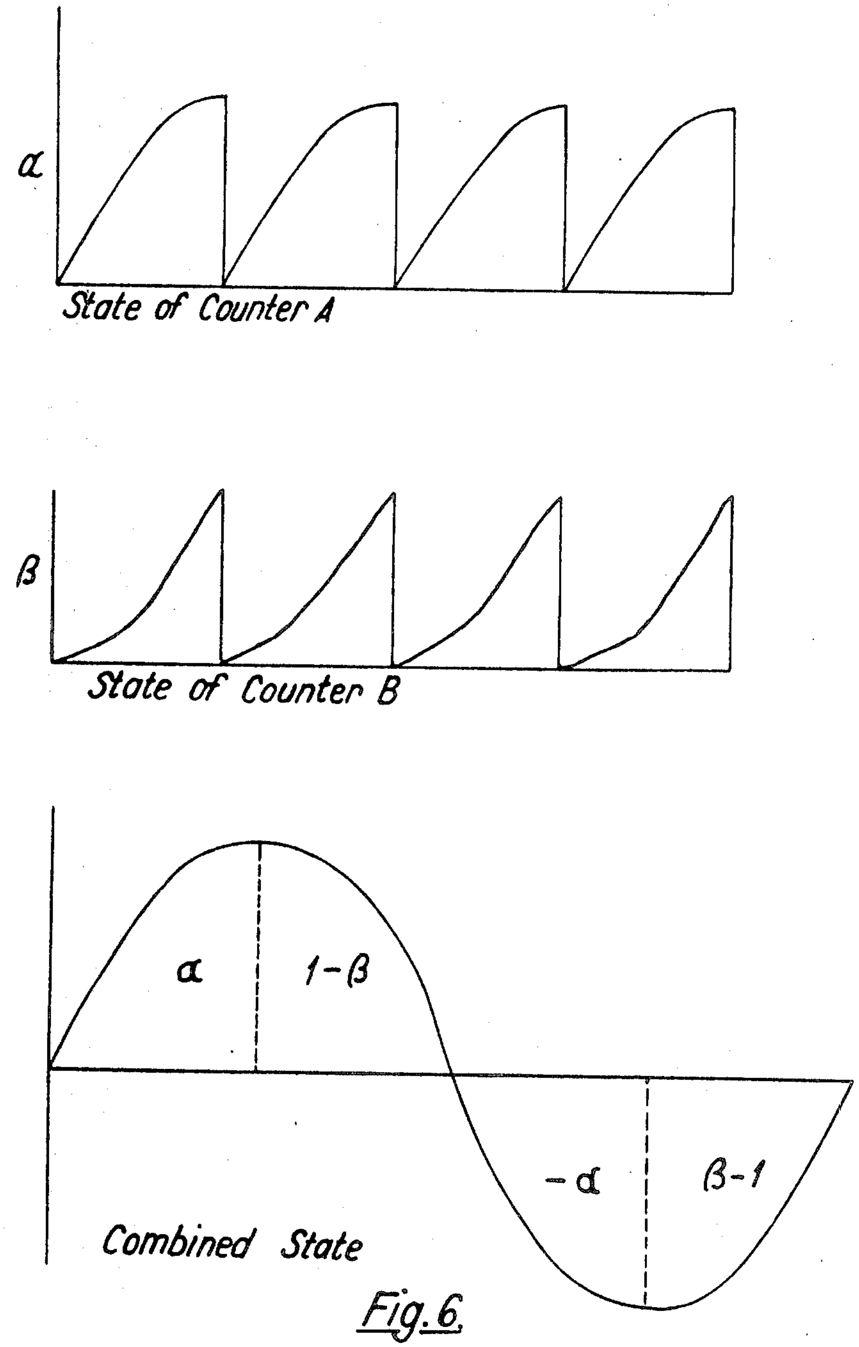
Figure 7:
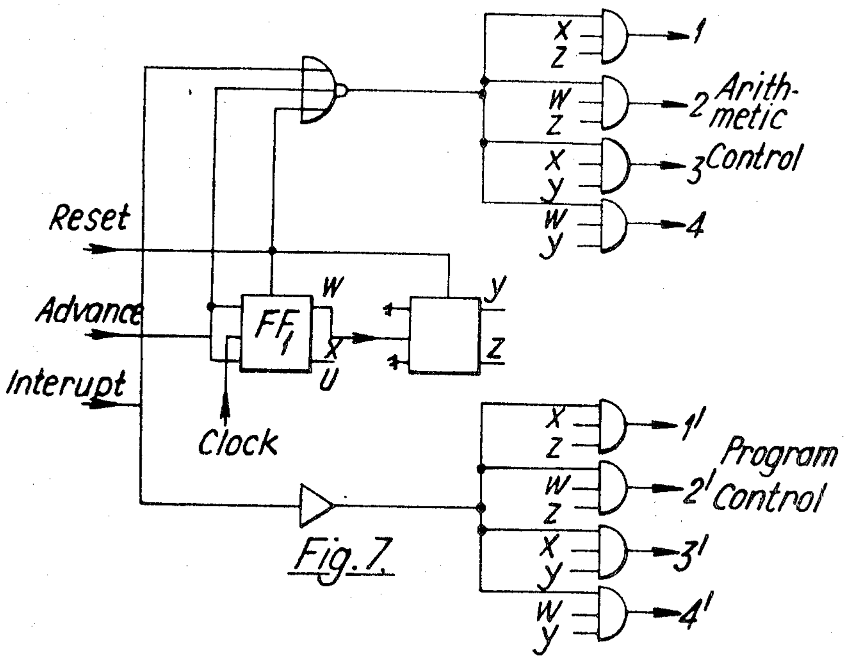
Figure 8:
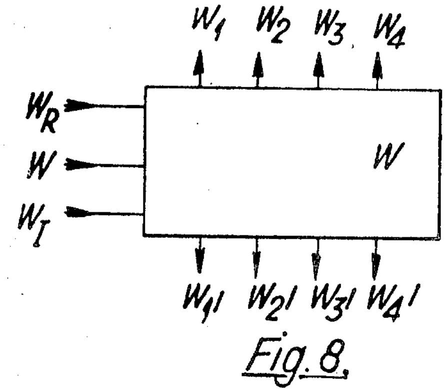
Figures 9, 10:
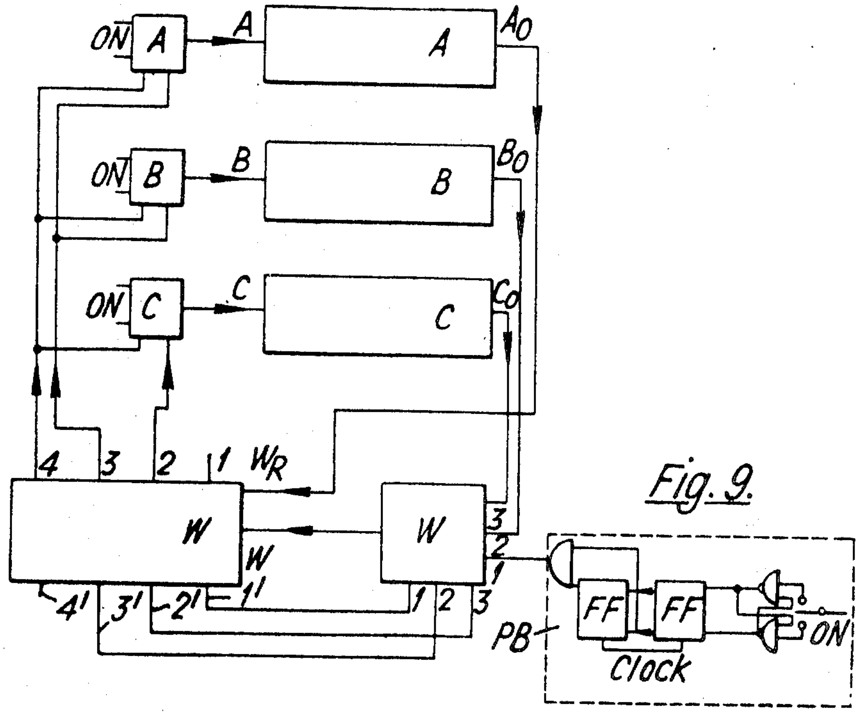
Figure 11:
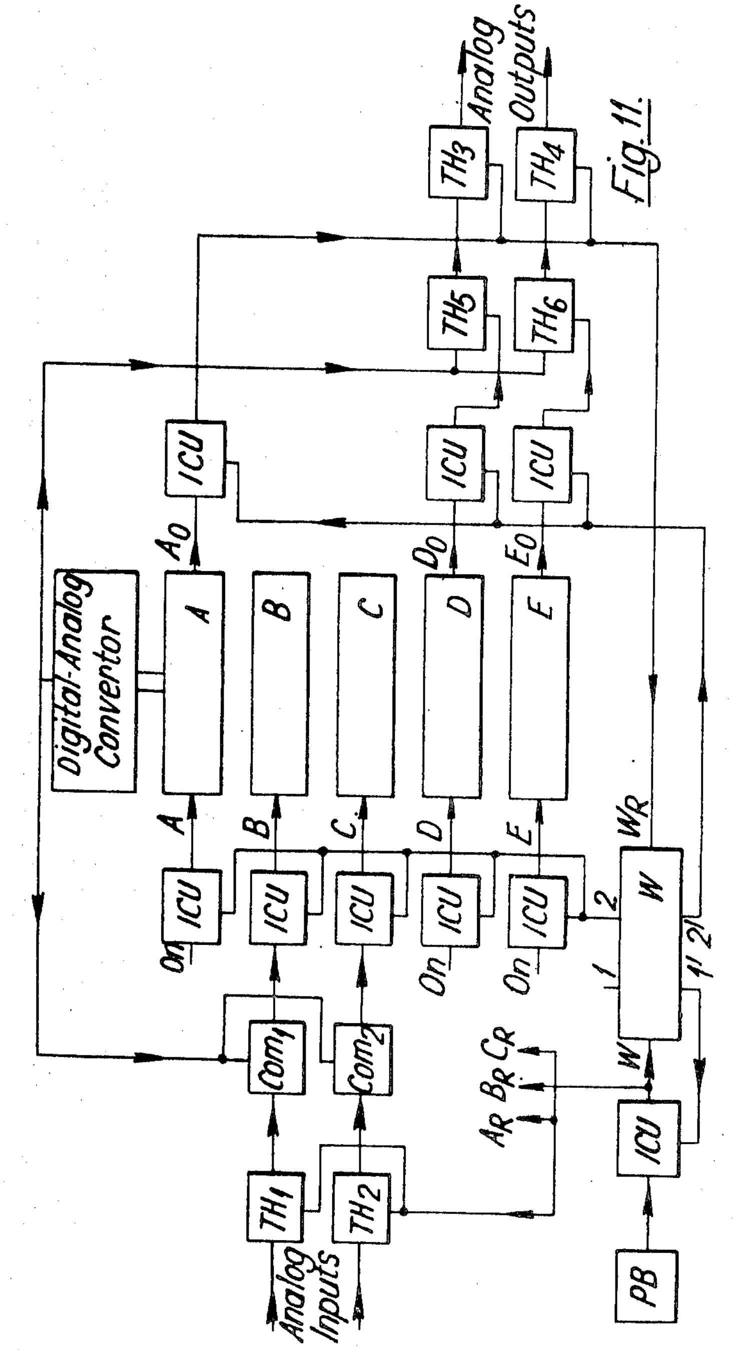

In order that the above and other features of the invention may be more readily understood an embodiment thereof will be described with reference to the accompanying drawings, in which FIG. 1 is a block diagram of a computer utilizing programmed incremental digital techniques, FIG. 2 illustrates the construction of a counter, FIG. 3 is a diagrammatic representation of a counter, FIG. 4 illustrates a synchronous counter with outputs for modulating another counter or register, FIG. 5 illustrates one form of interconnection between counters in the processor, FIG. 6 is a set of count patterns illustrating the operation of two digital counters generating a digital sine wave function, FIG. 7 illustrates the construction of a sequencer, FIG. 8 is a diagrammatic representation of a sequencer, FIG. 9 illustrates a pushbutton interface arrangement, FIG. 10 is a table illustrating a sequence of operations for the arrangement of FIG. 9, FIG. 11 illustrates an arrangement for performing reading in and reading out operations.

The computer shown in FIG. 1 has a conventional four-part structure consisting of a processor 1, a program sequencer 2, auxiliary storage 3 and input/output devices 4, 5, The main sections with which this invention is concerned are the processor and sequencer. The auxiliary storage in the laboratory prototype was realized as a patch board and the input/output devices can be any devices suitable for the circuits used in the processor and sequencer. Input/output devices particularly suitable for the processor and sequencer described here will be discussed later.

The principle of active storage enables computations to be performed with variables in their storage locations without transfer to accumulators or other specific comput-locations. The principle of differential storage enables modifications of the storage elements to be made during a computation without affecting the stored value at the end of a computation.

The method of active differential storage is used extensively in the computer—the quantity stored within a counter is generally represented by the count stored in that counter minus the count stored in another, its phase reference. Hence provided both counters are stationary or are counting at the same rate (i.e. have their input lines connected to the same sequence of logic levels) then the stored quantity is invariant even though the count may be changing. When the phase reference of a counter contains zero then that counter contains a binary representation of the stored quantity; in some computations a counter is used in such a way that it does not require a phase reference but it may alternatively be regarded as having a phase reference counter which always contains zero count.

The processor 1 comprises a number of active storage registers which are realized in the form of unidirectional, synchronous binary counters 10 which are interconnected by modulators. The counters, at a clock pulse, increment by unity if their INPUT line is ON and reset to zero if their RESET line is ON. A typical counter is illustrated in FIG. 2 and consists of a sequence of flip-flops $FF_1$, $FF_2$... $FF_N$. The input A to the counter is by way of a set of gates in the input control unit responsive to two sets of logic levels A[1], A[2], etc. and A[1′], A[2′] etc. The input control unit controls the application of clock pulses to the first flip-flop $FF_1$. Thereafter the propagation of the count within the counter is self excited, i.e. the counter is operating in which is called a "ripple" mode. Thus although the counters operate synchronously as complete computing devices, they may be asynchronous internally. Reset is accomplished by energizing the reset line $A_R$.

Each counter also includes a differentiator which is a further flip-flop $FF_D$, the function of which is to indicate the transitions of flip-flop $FF_N$. Two outputs are available, $A_O$ when $FF_N$ was in the 1 condition and is now in the O condition and $A_1$ when it is in the 1 condition, having been previously in the O condition. Hence $A_O$ will be ON for the clock until immediately after A has counted into its zeroth state, and $A_1$ will be ON for the clock until immediately after A has counted to its midrange state, $2^{n11}$. A third output $A_S$ is derived directly from $FF_N$. This output is referred to as the "sign" bit and is used when performing signed arithmetic. The complete counter is represented diagrammatically in FIG. 3. The outputs $A_O$, $A_1$and $A_S$ are the outputs for counter A.

If the proportion of ON logic levels on the INPUT line to a digital counter is considered as the input variable, then the counter may be regarded as a discrete version of an analog integrator, in that its stored count will be proportional to the input times the period of integration. The counter alone, however, lacks an output in the same form as its input—the integral is available as a binary number rather than a sequence of logic levels. If the counter contains N flip-flops, so that its maximum count is $2^N-1$, and the count in it is $k$, then an output sequence is required in which the proportion of ON LOGIC LEVELS IS $k/2^N$; that is, the number stored in the counter regarded as a binary fraction. With this output the resemblance to an analog integrator is complete, and the counters may be cross-connected to perform the functions of analog computing loops, as they are in the DDA and operational-digital computers.

The generation of incremental digital sequences is best realized by using an "add-and-overflow" technique, as used in conventional digital differential analyzers (DDA). The arrangement is illustrated in FIG. 4. A and C are counters and R is a register. At a clock pulse if the input to C is ON then the sum of the quantities in A and R available at the output of the ADDER (an array of logical gates) is set into R. The ADDER has an output corresponding to an overflow, A plus R being greater than the maximum range of a counter, and this is used as the output $C_A$ giving an incremental sequence corresponding to the rotation of C modulated by the count in A. If the INPUT line to A is OFF and that to C is ON, then the proportion of ON logic levels on the line $C_A$ is equal to the fractional binary number in the register A. If the INPUT line to C is OFF then so is the output line $C_A$. If the INPUT line to A is ON together with that to C, then the proportion of ON logic levels on $C_A$ corresponds, in some sense, to the varying number in the register A. The modulator counter, C, may occasionally be a virtual counter, not necessarily existing in hardware, but, in general, it is a normal counter equivalent in its function to other counters such as A. Thus any counter/register is potentially capable of modulating the counting of another such counter/register.

Because the counters are synchronous and controlled by logic levels rather than pulses, they may be used in pseudoanalog computing loops even though the counting is unidirectional. FIG. 5 illustrates one common form of interconnection in which the two counters, A and B, both modulating the counter, C, are connected in cascade with negative feedback around the pair. The output, $C_A$, of A is connected to the input of B, and the output, $C_B$ inverted, is connected to the input of A (simple inversion could not be used with a device whose output was a pulse rather than a logic level). The counters with this feedback are equivalent to a pair of analog integrators in cascade with negative feedback around the pair, a configuration which will undergo simple harmonic oscillation. The counters show similar behavior but, because their topology is different (an increment from maximum count leads to minimum count rather than limiting), the waveforms generated differ in some ways from those of the analog equivalent.

Consider both counters initially at zero, and the input to C ON. The two lines, $C_A$ and $C_B$, will both be OFF, and hence counter A will start counting at maximum rate because it receives $C_B$ inverted, whilst counter B will not count at all. As A begins to fill, however, $C_A$ begins to come ON and counter B starts to count. As B begins to fill, $C_B$ begins to come ON, and the count rate of A decreases. The net result is that the counts in A and B follow the repetitive patterns shown in FIG. 6, each cycle of which corresponds to one quadrant of simple harmonic generation. If we consider the fractional binary number, $\alpha$, in A for one quadrant, followed by one minus that in B, $1-\beta$, for the next quadrant, followed by $-\alpha$, followed by $\beta-1$, then we obtain a complete since wave as shown in the lower part of FIG. 6. A cosine wave may be constructed similarly, and hence the counters of FIG. 5 may be used as a four-quadrant, pulse-density sine/cosine generator if appropriate logic is used to select their outputs according to the quadrant.

An example has been given in the preceding paragraph of the use of counters with modulation facilities in a simple DDA configuration. This possibility of cross-connecting the registers to generate, in a pseudoanalog fashion, functions which are difficult to realize with parallel digital arithmetic is an important feature of the computer. In general, however, the loops used will be far simpler than those of conventional DDAs, the majority of counters generating ramps rather than complicated functions, and the basic computational operations realized in this way, such as addition, subtraction, multiplication and division, are combined in programmed sequences to yield more complex overall behavior.

The essence of programming, in all computers, is the control of the interconnections between processor elements by logic levels on CONTROL lines. The configuration required for this control is an AND/OR combination, fundamental in Boolean algebra, and readily fabricated with NAND gates. An example of a four-way AND/OR gate is shown in FIG. 3 at the input to the counter. It implements the functions: $A=A[1]\cdot A[1']+A[2]\cdot A[2']+A[3]\cdot A[3']+A[4]\cdot A[4']$, and may be regarded as a digital selector switch in which the INPUT line A $[j]$ is switched through to the output if the CONTROL line A $[j']$ is ON alone. This gate is called an input/control unit in the computer.

Input/control units placed at the inputs of counters enable them to be interconnected in several alternative patterns, any one of which may be selected by activating the appropriate CONTROL lines. In order to cause the computer to go through a programmed sequence of operations, it is necessary to activate the CONTROL lines corresponding to various interconnection patterns in the required sequence at the correct times, and a unit called a sequencer is used to perform this function.

A sequencer may be regarded as the digital equivalent of a rotary switch which activates one, and only one, of a number of output lines in turn. It is realized in practice, as illustrated in FIG. 7, by a small counter, to each of whose states there corresponds an OUTPUT line which is ON when the counter is in that state. The state of the counter may be changed at a clock pulse by ADVANCE and RESET lines which cause it to increment by unity, or reset to zero count, respectively; there is also inhibitory logic to the outputs whose function will be described below.

FIG. 8 shows a diagrammatic representation of a sequencer counter.

Input/control units are normally located in the inputs of the sequencer so that advancing and resetting may also be controlled by processor outputs.

The outputs of sequencer units are used to activate CONTROL lines, and different states of the sequencer correspond to different interconnection patterns amongst the computer counters. In any particular computation, signals will be required to advance the sequencer as each step in the computational sequence is completed. These are obtained by means of units called differentiators which detect the states of the counters, in particular the zero and midrange states.

The function of a digital differentiator in the computer is to indicate that a counter has entered the state 00000...00000, in which its count is zero, or, alternatively, that it has entered the state, 10000...00000, in which its count is $2^{N-1}$ (that is, midrange for a counter with N flip-flops). These states may be recognized by detecting a change in the most significant bit of the counter, and logic for this is illustrated at the last stage of the counter in FIG. 2. A delay flip-flop stores the previous state of the most significant bit, and gates are used to detect any difference in the present state. The symbol for a differentiator may be incorporated in that for a counter, and, in the lower part of FIG. 3, the differentiator output lines $A_0$ (ON when counter A has just entered the 00000...00000 state) and $A_1$ (ON when A has just entered the 10000...00000 state) are shown as outputs from the counter.

The differentiator also forms a convenient means of interfacing control signals from other sources into the computer. A pushbutton unit PB is illustrated on the right side of FIG. 9, consisting of two flip-flops and a digital differentiator. Depressing the pushbutton gives an ON level for one clock interval, which may be used to manually advance a sequencer and start a computation.

The use of differentiators and sequencers is best shown by means of a simple example, and the next section illustrates the importance of the counter states detected by differentiators with a simple computation which also leads to the general principle of a phase counter.

Consider the simple operation of reproducing a binary number in one counter, B, in another counter, C (it will be assumed, unless explicitly stated, that all counters have the same range). This might be required for data transfer, or counter C might have a BCD (binary-coded decimal) representation and drive numerical indicators for readout.

FIG. 9 illustrates a configuration, consisting of three counters and a four-way sequencer together with input/control units, for performing this operation. It is assumed that a pushbutton is used to initiate the transfer, that a third counter, A, is available whose count is initially zero, and that counter C must be zeroed before the transfer commences. The table in FIG. 10 shows the signals at the inputs to the counters for each state of the sequencer, and also lists the differentiator output which will cause the sequencer to advance from one state to another, or to reset.

State 1 of the sequencer corresponds to no activity and the inputs to all the counters are OFF. State 2 is entered on a signal from the pushbutton and counter C starts to count. When it enters its zeroth state the sequencer steps on to state 3 and counters A and B start counting until B enters its zeroth state and the sequencer advances to state 4. In this state all three counter inputs are ON and the counters rotate until A goes into its zeroth state whence the sequencer is reset to state 1 and remains there. It is possible for counters A and B to enter the zeroth state simultaneously (corresponding to zero in B), in which case the sequencer resets directly to state 1 from state 3.

The sequence of operations in the data transfer thus correspond to passivity in state 1 of the sequencer, initialization of C to zero in state 2 (if this is not done the computation becomes addition, B+C → C, instead of transfer, B → C), and data transfer in states 3 and 4. These last two states have a particular interest because they illustrate the phase counter principle—if the quantity stored in B is taken to be the difference between the binary number in B and the binary number in A, then this quantity is invariant provided the inputs A and B are either both ON, or both OFF. It will be noted that this condition holds in the table of FIG. 10, and that states 3 and 4 taken together correspond to a complete rotation of A from its zeroth state back to its zeroth state.

Counter A, used in this way, is said to act as a phase reference for counter B, and the use of the differentiator output $B_o$ to advance the sequencer from state 3 to state 4 is a means of reading out the fractional binary number stored in B as the mark/period ratio, number of clock pulses in which output 4 of the sequencer is ON divided by total number of clock pulses in which output 3 or output 4 is ON. It is the extensive use of this technique to read out stored quantities, in an alternative form to the incremental sequence obtained by modulation, that gives this computer its name of Phase Computer.

The table in the lower half of FIG. 10 gives all the information required to set up the configuration shown in FIG. 9, and further examples will be given in tabular form only. The effect on a register of any computational sequence can readily be ascertained from its table—for example, if the initial quantity in counter C is $\gamma$ (fractional binary number), then the quantity added is: zero in state 1 of the sequencer, $1-\gamma$ in state 2, zero in state 3, and $\beta$ (quantity in B) in state 4. The total is $\gamma+1-\gamma+\beta=1+\beta$, which is transfer of the quantity in B with one passage through zero ($1+\beta$ and $\beta$ are equivalent so far as the counter is concerned).

Slight variations in the table of FIG. 10 will give rise to different computations—it has already been noted that omission of the operations in the column corresponding to state 2 leads to the quantity in B being added to that in C and the result left in C. Leaving the reset and advance conditions as before, the following tables correspond to transferring $1-\beta$ to C, and transferring $\beta$ to C while zeroing B, respectively:

TABLE I

| State | 1 | 2 | 3 | 4 |
|---|---|---|---|---|
| A | 0 | | 1 | 1 |
| B | 0 | 0 | 1 | 1 |
| C | 0 | 1 | 1 | 0 |

TABLE II

| State | 1 | 2 | 3 | 4 |
|---|---|---|---|---|
| A | 0 | 0 | 1 | 1 |
| B | 0 | 0 | 1 | 0 |
| C | 0 | 1 | 0 | 1 |

Multiplication, division and squaring offer interesting examples of the simplicity of arithmetic operations in the phase computer. Computations in which the result is to replace one of the operands, C×B → C, C/B → C, $B^2$ → B, will be considered, since using another register for the result is simpler and readily derived from these. The phase reference counter, A, is additionally required to have a modulator output, $A_B$, but otherwise the configuration is closely similar to that of FIG. 10.

Multiplication, C×B → C, is realized in the next table:

TABLE III

| State | 1 | 2 | 3 |
|---|---|---|---|
| Reset | 0 | $A_o$ | $A_o$ |
| Advance | PB | $C_o$ | 0 |
| A | 0 | 1 | 1 |
| B | 0 | 0 | 0 |
| C | 0 | 1 | $A_B$ |

If the fractional binary numbers in B and C are $\beta$ and $\gamma$, respectively, then the final quantity in C is: $\gamma+0+1-\gamma+\beta\gamma=1+\beta\gamma=\beta\gamma$.

Division, C/B → C, is realized in a similar table by interchange of the inputs to A and C during state 3. Overflow may occur, and this may be recognized by detecting a second output on $C_o$ before there is one on $A_o$. In the following table this is used to cause the computation to terminate in state 4 when there is overflow.

TABLE IV

| State | 1 | 2 | 3 | 4 |
|---|---|---|---|---|
| Reset | 0 | $A_o$ | $A_o$ | 0 |
| Advance | PB | $C_o$ | $C_o$ | PB |
| A | 0 | 1 | $A_B$ | 0 |
| B | 0 | 0 | 0 | 0 |
| C | 0 | 1 | 1 | 0 |

Squaring, $B^2$ → B, gives the first example of generation of functions more complex than a simple ramp in phase computation. The input to counter B is connected to its own modulator output, $A_B$, so that the quantity in it increases as a parabola. The table for squaring is shown below:

TABLE V

| State | 1 | 2 | 3 |
|---|---|---|---|
| Reset | 0 | $A_o$ | $A_o$ |
| Advance | 0 | $B_o$ | 0 |
| A | 0 | 1 | 1 |
| B | 0 | 1 | $A_B$ |

The resemblance of this table to that for multiplication is clear, and square rooting may be obtained by the same transformation that led to division, interchange of the inputs to A and B in state 3.

Many variations on these computations are possible with the same simple configuration. For example, if the modulator output $A_C$ is also available, then a configuration similar to that of FIG. 5 may be used to effect vector rotation, and hence polar/rectangular coordinate conversion. In the examples so far, however, the quantities used in computation have been the unsigned fractional binary numbers in the counters. The following section extends the arithmetic operations to quantities taking both positive and negative values.

A two's-complement representation is used for signed quantities in the counter registers, with the sign bit reversed so that zero quantity corresponds to midrange of the counter, e.g. 01111...11111 in an N-bit register is the binary fraction $-\frac{1}{2}^{N11}$. The differentiator outputs corresponding to the state 10000...00000, $A_1$, $B_1$, etc., are used in reading out the sign and magnitude of a quantity using the phase counter principle. For example, consider the counter B in FIG. 10 to hold some quantity, $\beta$, in (modified) two's-complement form, and counter A to act as its phase reference. In states 3 and 4 of the sequencer A goes through one complete cycle, and the number of clock pulses between $A_1$ and $B_o$ coming ON is a measure of the magnitude of $\beta$. If $B_o$ comes ON first then $\beta$ is positive, whereas if $A_1$ comes ON first then $\beta$ is negative.

When a register holding a quantity in two's-complement form is used to modulate the cycling of a counter, then its most significant bit is disregarded in the modulation but used to invert the incremental digital sequence at the modulator output. The output of the modulator modified in this way represents the magnitude of the quantity in the register (labeled $A_B^*$ for B modulating A), and the sign bit ($B_S$) is also available to give a sign + magnitude representation.

Computations with signed quantities are more complex than with unsigned quantities, generally involving two or more sequencers to handle the sign information, and there is scope for great variety in setting up similar computations according to the initial and final data formats and locations required. Addition and subtraction are as simple as before, a configuration similar to that of FIG. 10 being sufficient. Multiplication of a signed quantity by an unsigned quantity is also comparatively simple, and is described in the following paragraph.

Consider the computation C×B → C, where counter C contains a quantity in two's-complement representation and B contains an unsigned constant. It will be assumed that counter A, initially at zero, is available to act as a phase reference to B, and that counter D is available to be modulated by B. Two four-way sequencers, Y to control counter A and Z to control counter C, are required—the inputs to B and D are OFF and ON respectively. The tables for the two sequencers are:

TABLE VI

| State | $Y_1$ | $Y_2$ | $Y_3$ | $Y_4$ |
|---|---|---|---|---|
| Advance | PB | $A_1$ | $C_0 Z_3$ | $A_0$ |
| A | 0 | 1 | $D_B$ | 1 |

TABLE VII

| State | $Z_1$ | $Z_2$ | $Z_3$ | $Z_4$ |
|---|---|---|---|---|
| Advance | PB | $C_0$ | $A_1+Y_3$ | $A_0$ |
| C | 0 | 1 | $D_B$ | 1 |

Multiplication of two signed quantities may be performed in several alternative configurations—the tables above may be extended to six-way sequencers which include further steps to reverse the sign of the quantity in counter C if the sign bit of register B is set; a third sequencer may be used to provide a subroutine for sign reversal, only entered if $B_S$ is set; if the computation is C×B → E, where E is another counter, then a very simple configuration is possible in which D acts as a phase reference to E.

Division, squaring, vector rotation, and so on, are all readily performed with bipolar quantities, but the configuration used will vary with the overall computation, since several operations on different registers will generally be performed at the same time. At present there are no algorithms for optimizing a configuration according to the overall effect required, and a major problem to be solved in the future development of the phase computer is to establish such algorithms for use in a hardware/program compiler.

Tables VI and VII offer an example of conditional branching in a phase computer program—the state $Y_3 \cdot Z_2$ is entered if $A_1$ occurs before $C_0$, while the state $Y_2 \cdot Z_3$ is entered if $C_0$ occurs before $A_1$; it will also be noted that the tables are linked so that $Y_3 \cdot Z_3$ cannot occur. Tables I to IV also offer examples of conditional branching—if $A_0$ and $C_0$ ($B_0$ in the final table) occur together there is an immediate return to state 1 without entry of state 3. In general branching will occur through a choice of advancing or resetting a single sequencer, or a choice of changing the state of one or more of a set of sequencers.

Subroutines are realized very simply in the phase computer since the operation of one sequencer is readily controlled by another. Each subroutine will generally be performed by a single sequencer, but the operation carried out may be varied by changing parameters of the routine (entries in the sequencer table). For example, the following table is a variation on that of FIG. 10, in which data transfer may be carried out, with or without sign inversion, from B to C or from C to B:

TABLE VIII

| State | $U_1$ | $U_2$ | $U_3$ |
|---|---|---|---|
| Reset | 0 | $A_0$ | $A_0$ |
| Advance | I+J+K+L | $B_0+C_0$ | 0 |
| A | 0 | 1 | 1 |
| B | 0 | I+K+L | J |
| C | 0 | J+K+L | I |

The control lines, I, J, K, L, when ON, each cause the operation:

I—C+B → C, O → B;
J—B+C → B, O → C;
K—C—B → C, O → B;
L—B—C → B, O → C.

Hence if sequencer V uses U as a subroutine and $I=V_i$, $L=V_{i+1}$, and $A_0$ causes advance from both $V_i$ and $V_{i+1}$, then the net effect of passage through these two states is to use subroutine U twice to reverse the sign of the quantity in register B.

One feature of the sequencer of FIG. 8 which has not yet been discussed is the provision of two sets of outputs. Sequencer outputs are used to control both the inputs to counters (processing elements) and its own inputs plus, possibly, those of other sequencers (programming elements). Advancing and resetting the sequencer must inhibit the operation of controlled processing elements but not that of programming elements; this is apparent in the example of FIG. 10. It is also necessary to have the facility of interrupting the operation of a sequencer completely, e.g. when different elements share the same output device, and this provided through an INTERRUPT line, $W_I$.

Since most applications of the phase computer are in real time data processing, control and display systems, data input and output has been an important consideration in the design of the computer, and facilities for BCD/binary conversion, and analog/digital conversion, fit naturally into the structure of the machine.

Any counter in the computer is potentially capable of being set directly with a binary number, and also of being read out directly from the condition of its flip-flips. It is more convenient, however, to utilize special interface counters for binary input and output, and transfer from these to the required register by a subroutine. The internal counters, used in computations, can then have a very simple structure with a minimum of connections. Interface counters having a BCD representation may then be used for automatic decimal → binary, and binary → decimal, conversion at the input and output of the computer. The laboratory prototype phase computer has an addressing system enabling any of its 14 internal counters to be reset, set with signed number from decimal keyboard, incremented or decremented by that number, or nondestructively read out in decimal or binary form, signed or unsigned.

Input and output of analog data on many parallel channels is performed in the phase computer by a single digital → analog converter, plus analog track/hold and comparator units for each channel. The D/A converter generates a ramp by outputting the quantity in a cycling counter in analog form, and this is compared with analog inputs to control the counting of other counters which act as input registers, or sampled by track/hold units at the output which are themselves controlled by the counters whose value is to be read out.

FIG. 11 illustrates a configuration for reading analog data into two input registers, B and C, and simultaneously reading out, nondestructively, two other registers, D and E, in analog form. Counter A acts as a phase reference to counters D and E, and is also coupled to the D/A converter to generate a ramp. In state 1 of the sequencer none of the counter inputs are forced ON, and, in this state, computations may be carried out with the contents of A, B, C, D and E, under the control of other sequencers.

When the pushbutton PB is depressed (or an input signal is received from another source), the analog inputs are sampled by track/hold units, $TH_1$ and $TH_2$, counters A, B and C, are zeroed, and the sequencer advances to state 2. In this state the inputs to counters A, D and E are ON, while those to B and C are connected to comparators, each of whose outputs is ON if their analog input is greater than the output of the D/A converter (they are bound to be ON initially if the analog inputs are within range). As counter A cycles the output of the D/A converter increases and will eventually become greater than each of the analog inputs. When it does so the comparator output of that channel goes OFF and the corresponding counter stops counting—analog → digital conversion is then complete. As D and E cycle their differentiator outputs, $D_o$ and $E_o$, will come ON and cause the D/A converter output to be sampled and held in $TH_5$ and $TH_6$ respectively. When, finally, counter A returns to zero and $A_o$ comes ON, the sequencer is reset to state 1, and the analog values stored in $TH_5$ and $TH_6$ are transferred to the output channels, $TH_3$ and $TH_4$, respectively—digital → analog conversion is then complete.

The speed of the incremental processor in performing simple operations is less than that of a parallel digital processor because of the counting technique used, and the disparity becomes greater with increasing precision in computation. This factor is very much decreased in computations where a number of complex operations may be carried out at the same time. At present, with a 4 Mcs clock frequency, operations can be carried out with 10-bit precision and accuracy (using the predictive modulator) in times of about 250 microseconds, and with 12-bit accuracy in about 1 millisecond. These speeds and accuracies have proved to be ample for a large class of data processing and control applications, and enable advantage to be taken of the economy of phase computing.

There are only five basic modules in the phase computer, counters, modulator, input/control units, sequencers and differentiators. These may be fabricated with standard integrated circuits and utilize fully the high packing-density devices, such as 4-bit counters and quad adders. By their simplicity and uniformity of structure, and their few interconnections, the modules and module systems are eminently suitable for large-scale integration.

We claim:

1. In a data processing arrangement, equipment comprising:
a processor having a plurality of counters interconnected to perform the functions of analog computing loops, so that the quantity stored in a counter is represented by the difference between the count in that counter and the count stored in another, phase reference, counter;
a sequencer responsive to the outputs of said processor to control interconnection patterns of said plurality of counters, said sequencer including a plurality of sequence counters to each of whose states there corresponds only one output which is ON when a sequence counter is in that state;
said plurality of counters and sequence counters are unidirectional, synchronous binary counters; and
a clock pulse source and means for gating the clock pulses to the inputs of said plurality of counters and sequence counters, whereby said counters are incremented by unity if the input gating is in an ON condition.

2. The equipment according to claim 1 wherein said plurality of counters and sequence counters each comprise:
a sequence of series connected flip-flops having a clock pulse input coupled to the first flip-flop of the sequence, and the propagation of the count within the counter being self-excited in response to a first clock pulse input.

3. The equipment according to claim 2 in which each of said plurality of counters in said processor include a differentiating means whereby the transitions of the last flip-flop of the sequence are indicated.

4. The equipment according to claim 2 in which each of said plurality of counters and sequence counters includes reset means whereby each counter is reset to zero count when the reset means is energized.

5. The equipment according to claim 1 including in said processor adding means and a register coupled to two of said plurality of counters, whereby the quantity stored in one counter is added to that in the register, this one counter and the register having an equal number of flip-flops, the output of the adding means corresponding to an overflow in addition to comprising an incremental digital sequence.

6. The equipment according to claim 1 in which the means for gating the clock-pulse input to each of said sequence counters comprises a set of AND gates each responsive to two inputs, one of which may be an output from one counter in the processor, the other being either an output from one sequencer counter or an input from an external source.